(12) United States Patent
Wullenweber et al.

(10) Patent No.: US 6,533,995 B1
(45) Date of Patent: Mar. 18, 2003

(54) PROCESS FOR THE LAMINAR BONDING OF MATERIALS

(75) Inventors: Heinz Wullenweber, Frankfurt (DE); Manfred Laudenklos, Schoneck (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/194,689

(22) PCT Filed: May 27, 1997

(86) PCT No.: PCT/EP97/02726

§ 371 (c)(1),
(2), (4) Date: Jun. 10, 1999

(87) PCT Pub. No.: WO97/46345

PCT Pub. Date: Dec. 11, 1997

(30) Foreign Application Priority Data

Jun. 1, 1996 (DE) .......................................... 196 21 977

(51) Int. Cl.[7] .................................................. B22F 7/04
(52) U.S. Cl. .......................................................... 419/9
(58) Field of Search .............................................. 419/9

(56) References Cited

U.S. PATENT DOCUMENTS

| | | | | |
|---|---|---|---|---|
| 5,074,458 A | * | 12/1991 | Tanaka et al. | ............... 228/232 |
| 5,389,408 A | * | 2/1995 | DeVolk | ....................... 427/559 |
| 5,534,091 A | * | 7/1996 | Okuda et al. | .................. 156/89 |

* cited by examiner

*Primary Examiner*—Daniel J. Jenkins
(74) *Attorney, Agent, or Firm*—Jones, Tullar & Cooper, P.C.

(57) ABSTRACT

The present invention relates to a process for the laminar bonding of materials using a carrier material and at least one electroconductive and possibly compressed powder coat, or an electroconductive powder which is compressed to form a flat moulded article, whereby the carrier material and the powder coat, or the powder-based moulded article are subjected briefly to a magnetic alternating field in the frequency range of ca. 10 kHz to 120 MHz in order to generate in the powder coat or the powder-based moulded article an induction current of such energy density that the points of contact of the powder particles among themselves and if a carrier material is used, also their points of contact with the carrier material are fused together at a temperature above the sintering temperature.

19 Claims, 2 Drawing Sheets

PROCESS FOR THE LAMINAR BONDING OF MATERIALS

TECHNICAL FIELD

The present invention relates to a process for the laminar bonding of materials such as strips, foils or sheets, from a carrier material and at least one electroconductive and possibly compressed electroconductive powder coat, or from an electroconductive powder-based molded articles devoid of a carrier material wherein the carrier material and the powder coat or the powder-based molded article are exposed briefly to a magnetic alternating field in the frequency range from ca. 10 kHz to 120 MHz in order to generate in the powder coat or the powder-based molded article an induction current of such energy density that the points of contact of the powder particles among themselves and, if a carrier material is used, also their points of contact with this material are fused together at a temperature above the sintering temperature.

BACKGROUND OF THE INVENTION

The powder must therefore at least in part consist of electroconductive components so that it is possible to generate an electrical current by induction. The structure of the powder, i.e. whether it is spherical, irregular, fibrous or whatever, is immaterial.

The present invention is e.g. oriented towards the laminar bonding of such materials as are used on a large scale as electrodes in electrolysers, batteries or fuel cells and as catalytically active elements in chemical processes. Power coats of the materials often contain one or more components susceptible to thermal impairment at high temperatures and subject to high demands with respect to the cohesion of the bonding, especially if during operation gases are generated within the possibly porous structure which exert considerable force on the structure and may cause cracks in the coating. The present invention particularly refers to e.g. the laminar bonding of porous powder coats with and without a carrier material for use as fillers, filter holders, catalysts, catalyst holders, diaphragms or membranes and sliding bearings, whereby the pores are filled with substances improving the behaviour of the bearings, e.g. their sliding behaviour. The present invention also applies to the making of soldered connections which gain extra strength by the additional fusion of the parts to be connected, and also applies to the production of coatings in which high-melting particles are embedded in a low-melting environment, as well to the fixation of electroconductive coatings manufactured according to production methods used for paper, foil and non-wovens.

In a process known from German Patent, DE 38 13 744 A1, the powder grains of powder coats are fixed to each other and fixed to a carrier material if used, fixation takes place by sintering in a reduced atmosphere, i.e. by a diffusion process at the points of contact of the powder grains at a temperature of the magnitude $\frac{2}{3}$ to $\frac{4}{5}$ of the absolute melting temperature in the case of metal one-component systems, and in all cases of high-melting components of powder mixtures considerably below the absolute melting point. This also applies to a process known from German Patent DE 30 15 981 A1 for the manufacture of highly porous self-baking electrodes for electrical accumulators, whereby metal particles are sintered together at a high temperature to form a porous structure on a strip carrier material and whereby instead of radiant heating, the powder-coated carrier strip is subjected to brief inductive heating in the magnetic field at sintering temperature. From European Patent EP 0 274 673 B1 a process is also known whereby a powder coat is fixed within itself and at its points of contact to a carrier material by sintering of the parts by means of induction in the magnetic alternating field.

The known sintering processes are time-consuming and cost-intensive and because of the long sintering time may impair the structure and properties of the powders used. As the powder coats are only bonded within themselves and with the carrier material by sintering of the points of contact, it results in a relatively weak cohesion of the powder coats and especially only limited adhesion of the powder coats to the carrier material. A further disadvantage with the known processes is that the entire mass of the powder coats and carrier material must be brought to and maintained at the sintering temperature for several minutes. As a result the risk of thermal impairment of temperature-sensitive powder components cannot be excluded.

A process is known from U.S. Pat. No. 5,389,408 for treatment of metallic particles which are deposited in a predetermined pattern on a non-metallic carrier in order to continuously produce a metallic conductor in the form of such a pattern. For this purpose, the particles are subjected to sufficient electromagnetic energy in order to fuse at least some of the particles. The temperature of the particles during the introduction of the electromagnetic energy is observed and the electromagnetic field shut off when the temperature reaches a predetermined value. In this method, a considerable time period of a number of seconds is required in order to fuse the fusible particles so that they build a flowable metallic smelt from which the desired continuous, homogenous metallic conductor strips are produced on solidification.

SUMMARY OF THE INVENTION

The object of this invention is to provide a process for the laminar bonding of materials of the kind referred to in the foregoing which is fast, cost-effective and preserves the structure of the powder. Good cohesion of self-supporting powder coats within themselves and, if a carrier material is used, good adhesion of the powder coat to the carrier material must moreover be assured.

The object is achieved, according to the present invention, such that in a process of the kind referred to above, the carrier material and the powder coat or the powder-based moulded article are exposed briefly to a magnetic alternating field in the frequency range of ca. 10 kHz to 120 MHz in order to generate in the powder coat or the powder-based moulded article an induction current of such energy density that the points of contact of the powder particles among themselves and, if a carrier material is used, also their points of contact with this material are used together at a temperature above the sintering temperature.

This process avoids a lengthy and structure-modifying sintering heat treatment. The process as per the present invention is independent of how the powder is applied to the carrier material and of the thickness of the powder coat or several powder coats so applied. The only condition is that the powder contain electroconductive particles so that an electrical current can be induced. Basically this is achieved by producing fusible particle surfaces at a temperature above the sintering temperature i.e. with induction currents of such energy density and of such short duration that a maim temperature gradient prevails at the core of the powder grain so that the core temperature is below the sintering temperature for a particle size above a minimum size in the micrometer range. Therefore, the temperature consciously chosen for the process is the melting temperature which is considerably higher than the sintering temperature and the process takes place at the points of contact of the powder particles. The nature and extremely short duration of the bonding process produces a strong bond with superiority in terms of mechanical values of a fused connection over a sintered connection without impairment of the porosity and shape retention of the bond by the higher bonding temperature. The high temperature difference between molten particle border zones and the particle core zones can be ensured by selecting a particle size above a minimum size in the micrometer range.

The technological advantages of the process as per the present invention are as follows: The fusing of the powder particles among themselves and with a carrier material results in a product with greater strength, better processability and above all with better adhesion of the powder coat to the carrier material than is possible with a sintering process. Temperature-sensitive powder components which can be thermally impaired at higher temperatures, better retain their essential properties because of the low core temperature of the powder particles, which can be ensured by an adequate particle size. The value of the minimum size to be selected depends on the grain structure and the properties of the material. For instance, the activity of Raney nickel powder which is often used as the catalytically active powder component in electrode coatings, clearly remains intact better with the process as per the present invention. In addition to these technological advantages there is the advantage of lower product manufacturing cost as against the known sintering process, because the product no longer has to undergo the time-consuming and costly diffusion process of-sintering in a protective atmosphere, but can instead be bonded inductively in a fraction of a second and in most cases even without a protective gas.

In the manufacture of bonded materials in strip form it is e.g. possible due to its short duration to incorporate the bonding process as per the present invention cost-effectively in a processing line with the other process steps, whereas for the sintering process in which a very long and correspondingly expensive sintering furnace must be used, this is only possible at considerable expense, because the sintering time is quite a bit longer than the other process steps.

Advantageous with the process as per the present invention for the bonding of materials in the form of self-supporting or substrate-fixed porous powder coats is a good cohesion of the powder coats in themselves and, if a supporting layer is used, good adhesion of the powder coat to the supporting layer. Thermal impairment of temperature-sensitive powder components and in some cases also a temperature-sensitive carrier can in many cases be excluded. Manufacturing costs are reduced as compared to the known processes.

With the process as per the present invention, in the laminar bonding of materials using powder coats with a carrier material the powder or powder mixtures can first be sprinkled in dosed quantity onto the carrier material, then evenly distributed and pressed down on it and if necessary compressed further. In laminar bonding without a carrier material, dosed quantities of the powder can e.g. be discharged into the nip between two horizontally juxtaposed rolls and upon passing through the nip be compressed into a flat layer. In both cases the powder coats at this stage have only a relatively low mechanical strength which is sufficient however to keep the powder coats together as they are being transferred to the induction binding plant.

The bonded material with or without carrier material can e.g. be exposed to the magnetic alternating field, if the magnetic field is focused linearly and a sufficiently high induction voltage is generated to obtain the required high energy density necessary for fusing in a very short time.

In order to achieve, in an advantageous embodiment of the present invention and with a product-dependent minimum particle size in the micrometer range, the induction current is generated with such a high energy density and for such a short time that only the points of contact of the powder particles among themselves and, if a carrier material is used, also their points of contact with the carrier material are fused together at a temperature above the sintering temperature without the core zones of the powder particles reaching a temperature at which the properties of the powder components could change.

Thereby a special effort is made to generate the induction current with such a high energy density and for such a short time that the core zones of the powder particles do not reach their sintering temperatures.

In a further advantageous embodiment or the process as per the present invention the induction current is generated with such a high energy density and for such a short time that although the points of contact of the powder particles among themselves and, if a carrier material is used, also their points of contact with that material are fused together, the porosity of the powder coat or the powdered-based moulded article remains intact.

When carrying out the process as per the present invention, the powder, in addition to the electroconductive component, may contain at least one further component which may be metallic or non-metallic.

The powder may e.g. contain non-electroconductive components provided that the electroconductive components form a cohesive structure in which the non-conductive components are embedded.

For the carrier material, preference is given to sheet metal strips or sheets, metal foils, hard paper, plastic foils, in each case perforated or unperforated, expanded metal, wire mesh, non-wovens or the like, in each case with or without an adhesive surface, the non-metallic carrier material in each case with and without a metallised surface.

It is also possible to reroll the induction-bonded materials in order to reduce their thickness and/or to smooth their surfaces and/or to profile them.

Further according to the present invention the bonding process takes place in the presence of selected gases e.g. an inert gas for oxidation suppression or an ionisable gas and therefore in a plasma.

It is further possible that the bonding process is supported by deoxidizing agents.

The thickness of the powder coat maybe a matter of millimeters, but may also be a matter of a few atom layers as is preferred for expensive noble metal catalysts on supporting layers. Such thin coats can e.g. be produced by electrodeposition or deposition by electrostatic means or from a suspension, or precipitated from a solution or may also be applied as a sludge or paste and then dried. In many cases the adhesion of the coat is supposed by adhesives.

Further objects, features, advantages and applications of this invention will be evident from the following description of embodiments with reference to the drawing. This means that all features described and/or pictorially represented, alone or in any combination, constitute the subject matter of the present invention and to be precise, this applies regardless of their summary in the individual claims or cross-references contained in them.

DETAILED DESCRIPTION

Figure 1:
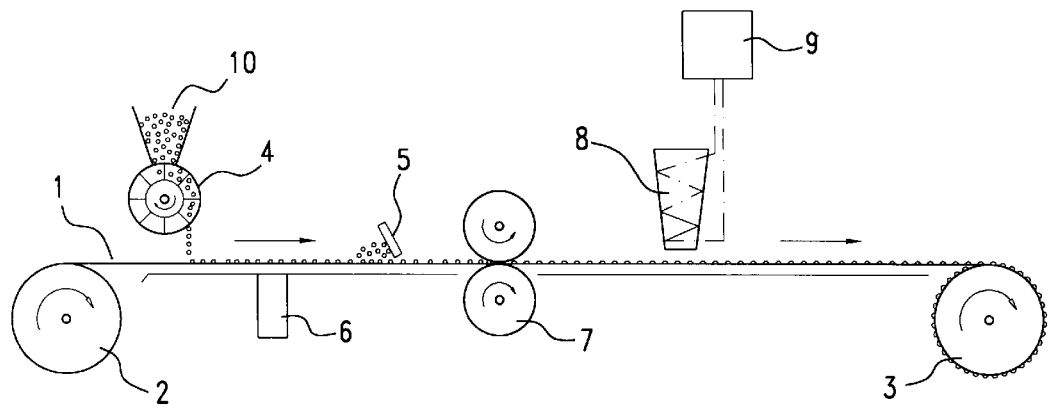
FIGS. 1 to 3 show embodiments of the process as per the present invention in which especially the preparatory production steps before the inductive powder fusion are emphasised.

FIG. 1 shows the laminar bonding of a roll-up material consisting of powder coats on a strip carrier.

For this purpose the carrier material, a roughened or profiled sheet metal strip 1 is wound off from a reel 2. The carrier strip 1 passes through several devices for coating and fixing the strip 1 with powder 10 and is rolled back onto a reel 3 after the powder coating.

After the carrier strip 1 has been wound off from the reel 2, powder 10 is sprinkled in a dosed quantity by means of a cellular spacing wheel or similar dosing device 4 onto the strip 1, evenly distributed on the strip 1 and pressed down on it by a distributing device 5, e.g. a doctor blade or a distributor roll (not shown), and additionally, if necessary, compressed by a pulsed magnetic constant field generated by a magnet or electromagnet 6 that is positioned before or behind the distributing device 5. If several powder coats are applied on top of each other, the dosing and distributing device 4, 5 for the first powder coat is followed by a second dosing and distributing device. This may occur if the first powder coat is intended as a bonding agent for a second more difficult to fix powder coat.

After the distributing device 5 the powder-coated carrier strip 1 passes through a set of rolls 7 in which the powder coats are pressed firmly onto the strip 1. Finally, the powder fixation takes place at the induction bonding device with inductor 8 and generator 9.

Suitable carrier material for the powder coats in this arrangement consists e.g. in sheet metal with and without perforation, foils, expanded metal, wire mesh or nonwovens of any electroconductive material. Smooth sheet metal should advantageously be roughened on the powder-bearing surfaces and/or profiled in such a way that the powder 10 metered onto the carrier strip 1, even if the strip is run through rapidly to boost production, is not pushed off by the distributing device 5. Cross or diagonal ribbing of the carrier strip 1 is advantageous.

Figure 2:
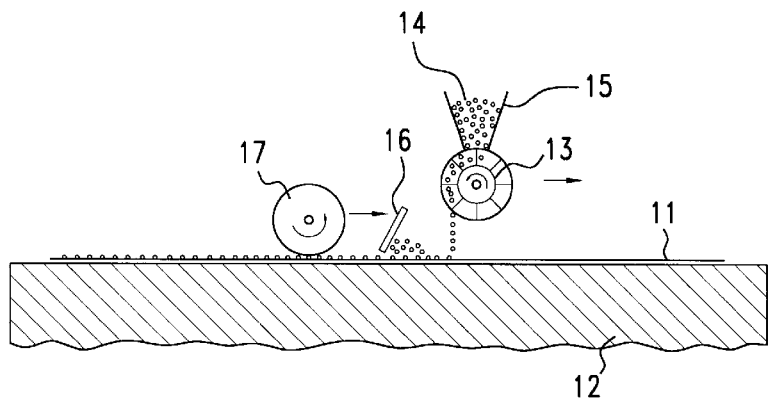

With the embodiment as per FIG. 2 the laminar bonding is carried out on a foil with a powder coat on each side of the carrier strip 1. For this purpose an even mat 11 of fine-meshed wire mesh is placed as a carrier material on a solid, even support 12 after which a cellular spacing wheel or similar dosing device 13 passes over it and sprinkles powder 14 from a container 15 onto the mat 11. A traveling distributing device 16 spreads the powder 14 evenly over the mat 11 and simultaneously presses it lightly into its mesh. A traveling press roll 17 then compresses the bond between the wire mesh and the powder in such a way that it can be handled more easily and be picked up, turned over and put back on the support 12 with the powder-coated side down by a conveying and lifting device. In this position it is now possible, although this may not be required, to coat the second side of the mat 11 with powder 14 by the same sequence of operations as just described. The wire mesh mat 11 with powder coating on both sides is now taken up by a conveying and lifting device and carried either directly to the induction bonding device or first to a roll stand for secondary compression of the bond and then to the induction bonding device where the powder fusing takes place.

Figure 3:
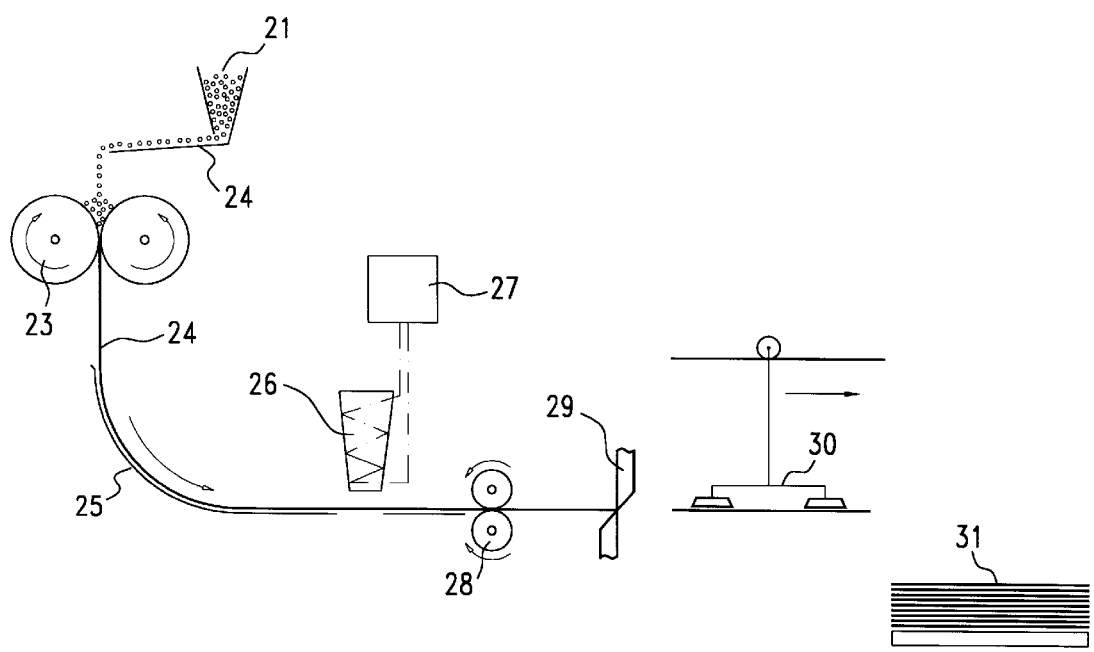

The embodiment in FIG. 3 shows the process for a self-supporting powder bond e.g. a powder-based moulded article without a carrier material.

For this purpose a powder 21 consisting of one or more components runs from above via a dosing chute or similar dosing device 22 into a set of rolls 23 with two horizontally juxaposed rolls between which the powder 21 is compressed so that a moulded article 24 is obtained with sufficient mechanical strength for conveyance by a trough-line guide 25 to the induction bonding device with inductor 26 and generator 27. As it passes through the induction bonding device 26, 27 the increased strength of the moulded article 24 makes it suitable for handling so that it can be conveyed and rolled up by a set of carrier rolls or else is cut by a traveling cutting machine 29 in sections of a desired length which are finally placed by a conveying device 30 on a stack 31.

According to all the processes as per the present invention that have been presented it is possible to fix all powder materials which meet the condition of electroconductivity, e.g. not only metallic powders, but also oxidic and other metal compounds and carbon and several carbon compounds during the inductive bonding of which the bonding conditions become more favourable in some cases by the production of a plasma, ie. the bonding in the presence of ionisable gases.

With all the processes as per the present invention that have been presented, deoxidizing agents can also be used advantageously for dissolving oxidic coats on the surface of powder and carrier material.

With all the processes as per the present invention that have been presented, the induction bonding step happens in a fraction of a second. This makes it possible to carry out all the processing steps cost-effectively and quickly in a single operation.

In many cases it will be useful to roll down the intermediate product obtained through the processes as per FIGS. 1 and 2 fro e.g. 2.0 mm thickness to a final thickness of 0.2 mm or less, mostly with intermediate annealing which can be carried out using the same plant as for the induction bonding, but with a modified inductor, in order to reduce the increasing hardness of the material as a result of the rolling process. Thus it is possible to manufacture end products that are superior to the intermediate product in two respects: first, they have more applications in construction, because they are easily deformable and even at spring hardness can be used as elastic, resilient structural elements, and second, in the case of expensive materials they are more cost-effective compared to the thick intermediate product when the cost is expressed in relation to the surface unit which is e.g. decisive for use as an electrode.

Exemplary Embodiment

For the production of an electrode intended for use as a cathode, a soft-annealed nickel plate with 99.2% Ni and a thickness of 1 mm and width of 50 mm was roughened on one side with the aid of a belt grinder, then a powder mixture of one part of a Raney nickel alloy (aluminium; nickel ratio 1:1 and a grain spectrum in the range of 10–40 $\mu$m) and one part carbonyl nickel was sprinkled onto this side and evenly distributed by means of a blade-type distributing device, resulting in a powder coat thickness of 0.5 mm This bond was then compressed by rolling to an overall thickness of 1.0 mm.

This lamination was then passed at a rate of 5 cm/s through a magnetic alternating field focused into the coating with an inductor. The inductor had been set at a resonance frequency of 60 kHz.

The powder coating of the sample thus produced for use as a cathode in an electrolyser had very good adhesion to the nickel plate substrate and showed excellent electrochemical behaviour which verifies the high activity of the Raney nickel catalyst without thermal impairment. The cathode potential, after activation of the powder coat by dissolving the aluminium component out of the Raney nickel, had a value of −975 mV at a surface load of 2 kA/m² measured against a Hg/HgO comparison electrode.

What is claimed is:

1. A process for the laminar bonding of material comprising the steps of:
   providing a carrier material selected from a group comprising strips, foils or sheets;
   applying at least one electroconductive powder coat of powder particles onto the carrier material; and
   exposing said at least one electroconductive powder coat to a magnetic alternating field in the frequency range from ca. 10 kHz to 120 MHz to thereby generate in said at least one electroconductive powder coat an induction current having an energy density that the points of contact of the powder particles among themselves and with the carrier material are fused together at a temperature above the sintering temperature of the powder particles, wherein said generated induction current has an energy density and duration that the core zones of the powder particles do not reach a temperature at which the properties of the powder particles change.

2. The process as defined in claim 1, further comprising the step of:
   compressing said at least one electroconductive powder coat after exposure to said magnetic alternating field.

3. The process as defined in claim 1, wherein said generated induction current has an energy density and duration that the core zones of the powder particles do not reach their sintering temperature.

4. The process as defined in claim 1, wherein said at least one electroconductive powder coat is porous, and wherein said generated induction current has an energy density and duration that while fusion occurs the porosity remains intact.

5. The process as defined in claim 1, wherein said at least one electroconductive powder coat contains at least one further component in addition to said electroconductivity.

6. The process as defined in claim 1, wherein said at least one electroconductive powder coat contains non-electroconductive components such that the electroconductive components form a cohesive structure in which the non-electroconductive components are embedded.

7. The process as defined in claim 1, where in the carrier material includes one of: sheet metal strips or sheets; metal foils; hard paper; plastic foils; in each case with or without perforations, expanded metal; wire mesh; non-wovens, in each case with or without an adhesive surface, and wherein the non-metallic carrier material in each case may or may not have a metallized surface.

8. The process as defined in claim 1, further comprising the step of:
   rerolling the inductive-bonded laminations to produce one of: thickness reduction; and/or surface smoothness; and/or surface profiling.

9. The process as defined in claim 1, further comprising the step of:
   providing at least one of a protective gas for oxidation suppression or an ionizable gas during the bonding process, resulting therefore in a plasma.

10. The process as defined in claim 1, further comprising the step of:
    providing deoxidizing agents to support the bonding process.

11. A process for the laminar bonding of material into a molded article comprising the steps of:
    forming a molded article from at least one electroconductive powder coat of powder particles; and
    exposing said at least one electroconductive powder coat formed as said molded article to a magnetic alternating field in the frequency range from ca. 10 kHz to 120 MHz to thereby generate in said at least one electroconductive powder coat an induction current having an energy density that the points of contact of the powder particles forming said mold among themselves are fused together at a temperature above the sintering temperature of the powder particles; wherein said generated induction current has an energy density and duration that the core zones of the powder particles do not reach a temperature at which the properties of the powder particles change.

12. The process as defined in claim 11, further comprising the step of:
    compressing said at least one electroconductive powder coat before exposure to said magnetic alternating field.

13. The process as defined in claim 11, wherein said generated induction current has an energy density and duration that the core zones of the powder particles do not reach their sintering temperature.

14. The process as defined in claim 11, wherein said at least one electroconductive powder coat is porous, and wherein said generated induction current has an energy density and duration that while fusion occurs the porosity remains intact.

15. The process as defined in claim 11, wherein said at least one electroconductive powder coat contains at least one further component in addition to said electroconductivity.

16. The process as defined in claim 11, wherein said at least one electroconductive powder coat contains non-electroconductive components such that the electroconductive components form a cohesive structure in which the non-electroconductive components are embedded.

17. The process as defined in claim 11, further comprising the step of rerolling the inductive-bonded laminations to produce one of: thickness reduction; and/or surface smoothness; and/or surface profiling.

18. The process as defined in claim 11, further comprising the step of:
    providing at least one of a protective gas for oxidation suppression or an ionizable gas during the bonding process, resulting therefore in a plasma.

19. The process as defined in claim 11, further comprising the step of:
    providing deoxidizing agents to support the bonding process.

* * * * *